United States Patent [19]

Bergman

[11] Patent Number: 4,687,579

[45] Date of Patent: Aug. 18, 1987

[54] SINTERED COMPOSITE MEDIUM AND FILTER

[75] Inventor: Werner Bergman, Pleasanton, Calif.

[73] Assignee: The United States of America as represented by the United States Department of Energy, Washington, D.C.

[21] Appl. No.: 859,166

[22] Filed: May 2, 1986

[51] Int. Cl.⁴ .............................................. B01D 29/24
[52] U.S. Cl. ..................... 210/347; 55/500; 55/498; 55/521; 55/527; 55/497; 55/523; 428/357; 428/398; 210/496; 210/497.01; 210/493.1
[58] Field of Search ................. 55/523, 498, 500, 521, 55/497, 527; 428/357, 398; 210/347, 496, 497.01, 493.1

[56]        References Cited
       U.S. PATENT DOCUMENTS

| 2,826,265 | 3/1958 | DeWoody | 55/523 |
| 4,043,775 | 8/1977 | Solomon | 55/523 |
| 4,114,794 | 9/1978 | Storms | 55/523 |
| 4,122,015 | 10/1978 | Oda et al. | 210/510.1 |

FOREIGN PATENT DOCUMENTS

| 2739815 | 9/1978 | Fed. Rep. of Germany | 55/521 |
| 873926 | 7/1942 | France | 55/523 |

OTHER PUBLICATIONS

Synthetic Fibers in Paper Making–Battista, O. A. Interscience–John Wiley, New York, 6/23/64, pp. 178, 186, 195.

Primary Examiner—Bernard Nozick
Attorney, Agent, or Firm—Henry P. Sartorio; L. E. Carnahan; Judson R. Hightower

[57]  ABSTRACT

A particulate filter medium is formed of a sintered composite of 0.5 micron diameter quartz fibers and 2 micron diameter stainless steel fibers. A preferred composition is about 40 vol. % quartz and about 60 vol. % stainless steel fibers. The media is sintered at about 1100° C. to bond the stainless steel fibers into a cage network which holds the quartz fibers. High filter efficiency and low flow resistance are provided by the smaller quartz fibers. High strength is provided by the stainless steel fibers. The resulting media has a high efficiency and low pressure drop similar to the standard HEPA media, with tensile strength at least four times greater, and a maximum operating temperature of about 550° C. The invention also includes methods to form the composite media and a HEPA filter utilizing the composite media. The filter media can be used to filter particles in both liquids and gases.

13 Claims, 11 Drawing Figures

SINTERED COMPOSITE MEDIUM AND FILTER

The United States Government has rignts in this invention pursuant to Contract No. W-7405-ENG-48 between the U.S. Department of Energy and the University of California, for the operation of Lawrence Livermore National Laboratory.

BACKGROUND OF THE INVENTION

The invention relates to particulate filter media and its use in particulate filters for either gas or liquid filtration, especially to high efficiency particulate air (HEPA) filters.

High efficiency particulate air HEPA filters are utilized in a number of different industries including the nuclear industry to prevent chemical contamination. For various applications the filter should operate at high temperatures and have hign strength. The filter should have high efficiency at high flow rates. The filter design should also be as compact as possible to lessen the impact on the overall system design.

Presently, there are no commercially available particulate filters which have high efficiency, low flow resistance, high strength and high temperature resistance. Currently available filters generally have two or three of these characteristics but not all four. For example, reinforced membrane filters have high efficiency, reasonable flow resistance and high strength, but are destroyed at temperatures above about 200°–250° C., depending upon the composition. The standard glass fiber media used in high efficiency particulate air (HEPA) filters has a high efficiency and low flow resistance, but has low strength and low temperature (below 300° C.) resistance.

The high efficiency of the standard glass fiber HEPA filters results from the small size of the fibers utilized. However, adhesives used to bond the glass fibers together limit the temperature; conventional HEPA filters are not operative at temperatures over 300° C. Even if the glass fibers were held together by sandwiching between high temperature resistance screens, the glass fibers have a relatively low melting point. For high temperature filtration, refractory fibers must be used; unfortunately they do not have sufficiently small fiber diameters for high-efficiency air cleaning. The efficiency of a filter mat made from high-temperature resistance non-conducting fibers can be significantly increased by conversion to an electric air filter in which particles are removed from the air electrostatically, but this requires more complex apparatus and the presence of a high voltage.

HEPA filters used to protect both workers and the environment from hazardous air-borne material originally was designed for applications having relatively low particle loadings and essentially ambient temperature and pressure conditions. This is why commercial HEPA filters are very satisfactory for routine applications; they are prone to failure at high temperatures, high pressures, and high humidities. HEPA filters used in the nuclear industry are very effective in removing radioactive particles when used under conditions of low temperature, low humidity, and low flow-rates, however, current HEPA filters have their greatest problem under accident conditions in which the filters may fail due to high temperature, high humidity, and overpressure conditions. Although accidents may be rare, a filter failure in these circumstances could have serious consequences.

One approach to the problem is to fabricate HEPA filters from a fibrous, stainless steel media. However, although stainless steel filters can withstand high temperature, pressure and humidity, they do not have efficiencies comparable to conventional HEPA filters. The problem is that the smallest stainless steel fiber diameter that can be produced is about 2 microns and in order to achieve efficiencies comparable to current HEPA filters, it is necessary to have fiber diameters of about 0.5 microns. Thus, sintered metal filters have only a 65% efficiency or less at its minimum. The primary reason for the use of glass micro-filters in HEPA filters is the availability of bulk fibers having diameters as small as 0.3 microns which are responsible for the high efficiency of HEPA filters. Unfortunately, these microfibers cannot be formed into a high strength filter media using conventional adhesives.

Composite materials have been used in an attempt to improve properties of filter media. A reinforced HEPA filter media of glass fibers on a supporting screen provides the desired strength but is still subject to high temperature failure because the binder holding the fibers together will be burned off. The fibers will then be loose and not retained on the supporting screen. An alternate approach of growing metal oxide whiskers on metallic screens, in which the small diameter whiskers provide high-efficiency, while the metal screen provides high strength, has been successful only for copper screens.

A variety of other filters are known in the art for various applications, as illustrated by the following U.S. patents. However, none of these provide a HEPA filter having high-efficiency, low-flow resistance, high strength and high-temperature resistance.

U.S. Pat. No. 2,994,577 to Silverman shows a copper fibrous filter coated with silver for removing iodine from gases; the silver coating prevents the copper from oxidizing and also participates in a chemical reaction with iodine.

U.S. Pat. 3,217,471 to Silverman describes a support structure for filter media that can withstand high pressure pulses; the support comprises a honeycomb structure in a flat screen in which the filter media rests. An absorbent material such as activated charcoal, silver plated silica gel and silver-plated copper turnings is disposed in a honeycomb matrix formed of aluminum, stainless steel or reinforced fiberglass.

U.S. Pat. No. 3,299,620 to Hollingworth describes a complex air cleaning system in which air is first cleaned by a series of particulate and gas filters, then passes through a water scrubber, a demister and a series of particulate and gas filters, and finally passes through a germicidal element. Commercially available filter media are used, such as coated spun glass, copper, aluminum or shredded steel.

U.S. Pat. No. 4,088,737 to Thomas et al. shows a silver exchanged zeolite filter. U.S. Pat. No. 4,004,971 to Freck et al. shows a graphite block filter element for removing cesium gas and particles from a nuclear reactor. U.S. Pat. No. 2,982,858 to Hoyer et al. describes an atomic particle generating device with a sintered glass element to separate the plasma from the accelerator portion of the generator. U.S. Pat. No. 1,970,700 to Kendall describes an apparatus for removing trace impurity gas from a gas stream; oxygen is removed from gas streams by chemical reaction with various metals heated to high temperature.

SUMMARY OF THE INVENTION

It is an object of the invention to provide a HEPA filter media that has high-efficiency, low-flow resistance, high strength and high temperature resistance.

It is also an object of the invention to provide a filter media which maintains a high efficiency at temperatures over 300° C.

It is a further object of the invention to provide a HEPA filter media having the same efficiency and flow resistance as the standard HEPA glass media with four times the tensile strength which operates at 550° C.

It is another object of the invention to provide a HEPA filter which can withstand accident conditions of high-temperature, high-humidity and overpressure.

The invention is a composite filter media made from a mixture of quartz fibers and stainless steel fibers that have been sintered together. A preferred composite comprises about forty volume percent quartz fibers having about 0.5 micron diameter and about sixty volume percent stainless steel fibers having about 2 micron diameter. Sintering the composite media causes the metal fibers to fuse together in a random three-dimensional cage structure which mechanically holds the quartz fibers and gives the filter its strength. The quartz fibers are retained in the stainless steel network in a random orientation, and are responsible for the high filter efficiency. Quartz fibers are used rather than glass fibers because the glass would melt during the high temperature sintering operation. This composite media is particularly suitable to obtain the four desired properties. Although the steel fibers can be sintered together to yield a high strength media, steel fibers cannot be made small enough to have a high efficiency metal filter. Conversely quartz fibers are sufficiently small to yield high efficiencies but cannot be bonded together to form a high strength filter. However, in combination in the composite media the advantages of both the stainless steel and quartz fibers are obtained. The media is useful for filtering particulates in both gases and liquids.

The invention also includes a method of fabricating the composite filter media. Suspensions of stainless steel fibers and quartz fibers are first prepared. The suspensions are then combined and blended together and the mixture is poured into a mold. Alternatively, the quartz fibers can be blended into the same suspension as the stainless steel fibers. water is removed and the filter mat dried. The filter mat is then sintered in a hydrogen or vacuum furnace at a preferred temperature, typically about 1100° C., for a certain period of time, typically about two hours.

The invention also includes a high temperature metallic HEPA filter utilizing the composite media. In one embodiment the filter comprises a housing with inlet and outlet ports, a filter pack mounted in the housing which is formed of a plurality of pleated layers of the composite quartz and stainless steel fiber filter material mounted in the frame and a plurality of corrugated separators between the pleats, and sealing means between the pack and the housing to seal the edges of the pleated layers. Other filter configurations including cylindrical, pleated cylindrical, zig-zag, and stacked disk can also utilize the composite media. The filters can be used to filter particulates in both gases and liquids.

DETAILED DESCRIPTION OF THE PREFERRED EMBODIMENTS

The invention includes a sintered composite filter media made from a mixture of stainless steel and quartz fibers, a method for making the sintered composite filter media and a filter incorporating the sintered composite media. The filter media and filter have high temperature, high strength and high efficiency. Small diameter quartz fibers, with an average 0.5 micron diameter, provide the high efficiency. Larger diameter stainless steel fibers, with an average 2 micron diameter, provide the bonding mechanism for the quartz fibers and give the composite filter media high strength. High temperature sintering of the composite filter media, typically at a temperature of about 1100° C., fuses the metal fibers together to form a random three dimensional cage structure.

Figure 1A:
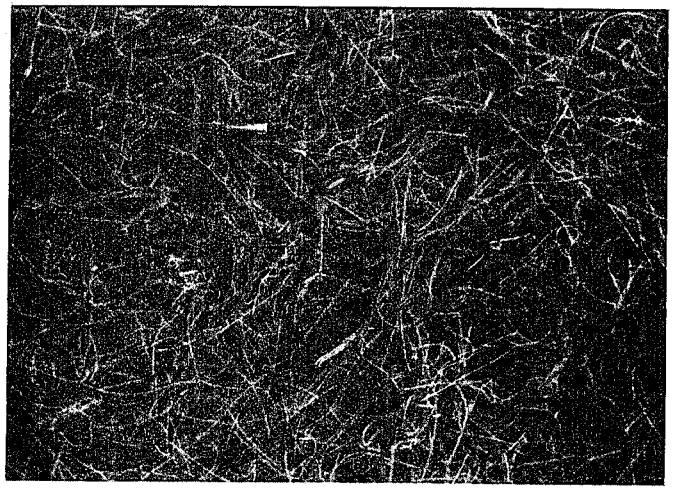
Figures 1A and B show scanning electron micrographs of 40 percent quartz, 60 percent stainless steel fiber composites at 200 X magnification.
Figure 1B:
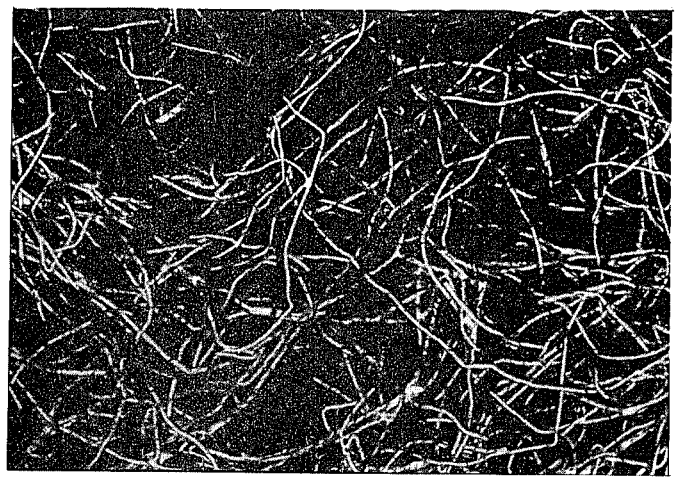
Figure 2A:
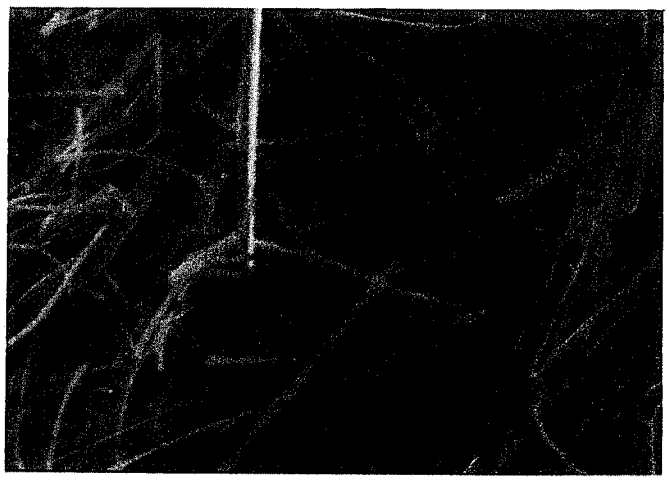
FIGS. 2A and B show scanning electron micrographs of 40 percent quartz, 60 percent stainless steel fiber composites at 1000 X magnification.
Figure 2B:

The composite filter media comprises quartz fibers dispersed in a supporting cage network of stainless steel fibers as shown in FIGS. 1A and B and 2A and B. FIGS. 1A and B are scanning electron micrographs of a composite filter media containing 40 volume percent quartz, 60 volume percent stainless steel fibers at 200 X magnification; FIGS. 2A and B are scanning micrographs of the same media at 1000 X. The stainless fibers have a uniform diameter of about 2 microns while the quartz fibers have a distribution of sizes around 0.5 micron diameter. FIGS. 1A and 2A are conventional electron micrographs obtained from the emission of secondary electrons which are independent of Z-number and therefore show both steel and quartz fibers as white images; the different fibers can be distinguished by the different diameters. FIGS. 1B and 2B are electron micrographs produced using backscattered electrons which show a clearer distinction between steel and quartz fibers since the higher Z fibers (steel) appear white. The glass fibers are dispersed throughout the supporting caged network of steel fibers. The steel fibers are bonded at points of contact to form a caged network; a clear example of the bond is shown in the lower right portions of FIGS. 2A and B.

The composite filter media is prepared by the following method. The appropriate quantity of stainless steel fibers, preferably Bekaert 304 stainless steel fibers, 1 mm long and 2 micron in diameter, are weighed, washed and blended in a water suspension held at pH=3 until the fibers are uniformly dispersed. Although 6 mm steel fibers have been utilized, it is much easier to form a suspension of the steel fibers using 1 mm fibers. The dispersion of steel fibers is also improved by adding a dispersal agent, e.g., American Cyanamid ACCURAC-130. The appropriate quantity of quartz fibers, preferably Johns-Manville 106 quartz fibers, 0.5 micron diameter, are weighed and separately blended in a water suspension held at pH=3 until the fibers are uniformly dispersed. In order to produce a preferred 40 vol.% quartz and 60 vol.% stainless steel fiber media, about 18 wt% quartz fibers and 82 wt% stainless steel fibers are used. The suspension of quartz fibers and the suspension of stainless steel fibers are then combined and blended together. Alternatively the quartz fibers can be blended in the same suspension as the dispersed steel fibers. The mixture of quartz and stainless steel fibers is poured into a mold, typically a 12 inch by 12 inch 100 mesh screen box and the water is drained. The fiber mat deposited on the screen is lifted off and excess water removed by blotting. The fiber mat is then dried on a heater. The final step in making the composite filter media is to sinter the filter mat in a hydrogen (or vacuum) furnace for a preselected time and at a preselected temperature. The preferred preselected temperature is about 1100° C. and the time is typically about 2 or 3 hours.

The composite filter media also can be prepared as a continuous sheet using the conventional paper making process on Fourdrinier, Rotoformer and other machines. A 10 inch wide Fourdrinier machine has been used to prepare a continuous sheet of the media; a suspension of steel and quartz fibers is prepared as previously described. Both the hand sheets and continuous sheets are sintered in a hydrogen furnace or vacuum furnace. Since the sintered media will crack if it is bent, the continuous media must be formed into the final filter configuration prior to sintering. In general, the tensile strength of the fiber mat increases with increasing sintering temperature and sintering time.

The resulting composite filter media have the same efficiency and flow resistance as the conventional glass HEPA media, while having greatly increased strength and operating temperature. Table I compares the properties of the conventional glass HEPA media and the composite media of the present invention.

TABLE I

|  | HEPA Media | Composite Media |
|---|---|---|
| Pressure drop | 0.70 in. | 0.83 in. |
| Efficiency | 99.995% | 99.999% |
| Force to tear | 169 g | 600 g |
| Maximum operating temp. | 300° C. | 550° C. |

Figure 3:
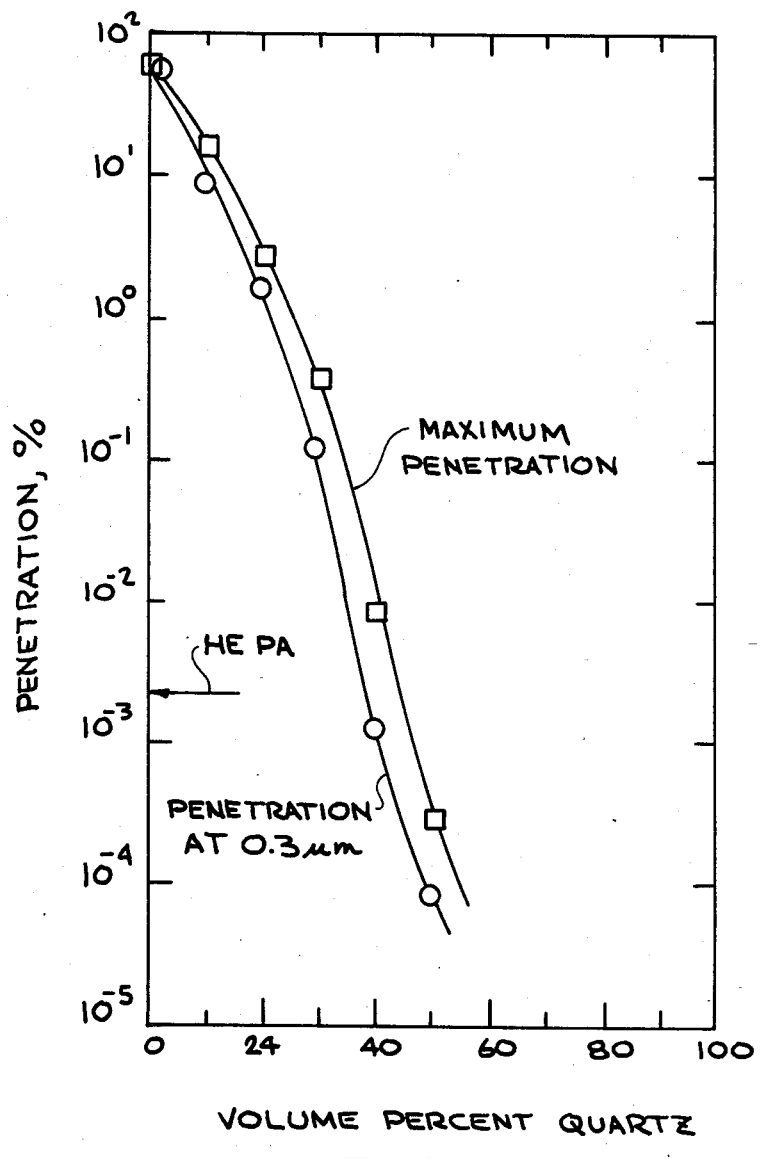
FIG. 3 is a graph of filter penetration as a function of quartz fiber volume percent.

Sample hand sheets were evaluated to determine the fraction of quartz fibers required to yield filter efficiency and pressure drop comparable to standard HEPA filters. Higher efficiency (a decrease in filter penetration) results with increasing quartz volume fraction. In addition, as the volume fraction of quartz increases, the width of the penetration curve decreases and the particle size of maximum penetration shifts to smaller sizes. The percent filter penetration as a function of percent quartz by volume is illustrated in FIG. 3. The higher curve represents the maximum penetration, while the lower curve represents the penetration at 0.3 micron diameter (which corresponds to the current certification test for HEPA filters). A conventional HEPA filter has a penetration of about 0.005% for 0.3 micron diameter particles, which would correspond to a composite filter having about 36% quartz by volume. Measurements of the penetration data for the composite filter as a function of pressure drop (inches of water) show comparable pressure drop to the standard HEPA filter (a 1″ pressure drop is typically specified for HEPA filters). Filter media with a greater fraction of quartz fibers have lower penetration and higher pressure drop.

Figure 4:
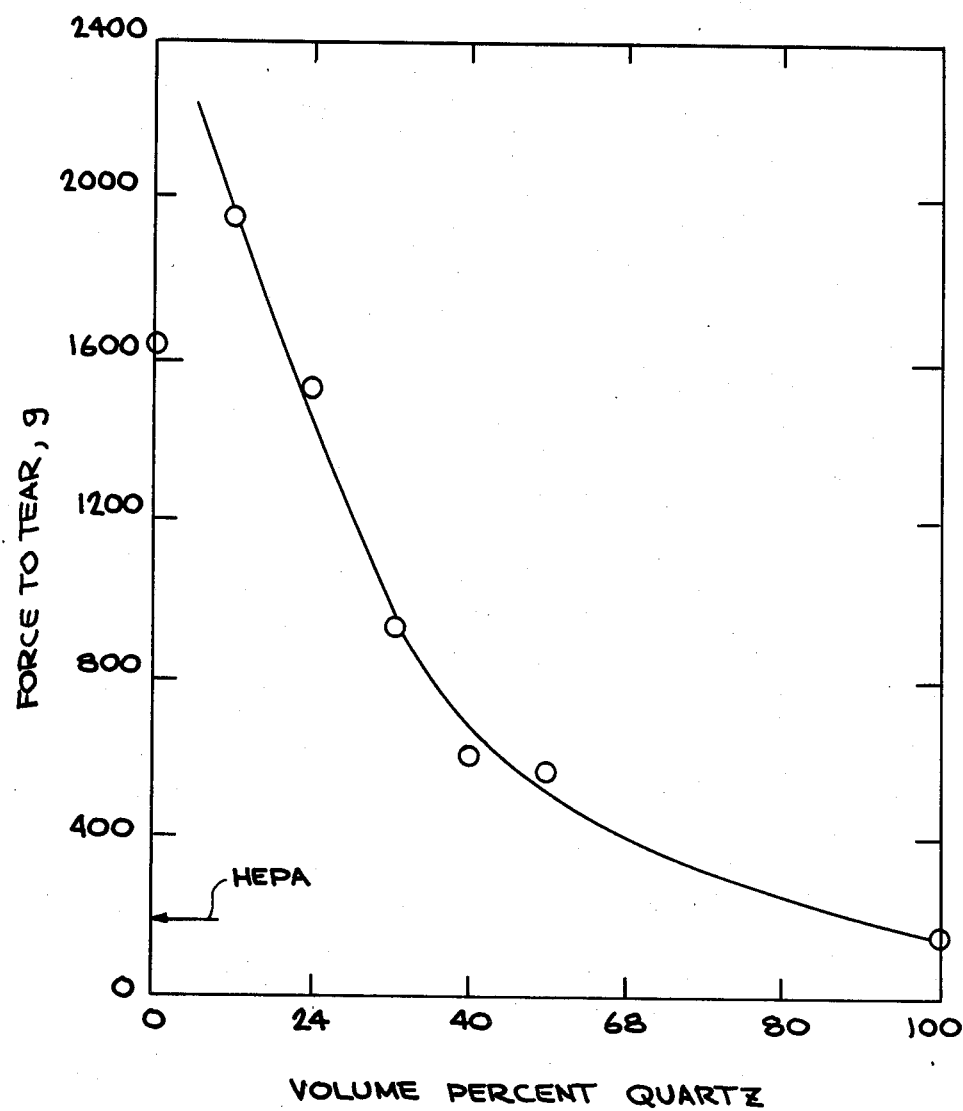
FIG. 4 is a graph of force to tear a filter sample as a function of quartz volume percent.

A primary advantage of the composite filter media is the increased filter strength. The grams of force required to tear a filter sample as a function of volume percent quartz is shown in FIG. 4. The filter is easier to tear as the percent of quartz increases (and steel decreases). A standard HEPA filter media tears at 170 g. A composite media having about 36% quartz requires about four times the tearing force of the standard HEPA media. Table II shows tensile strength measurements (in grams to break) for a number of samples sintered in a hydrogen furnace at 900° C., 1000° C., and 1100° C. for 3 hours, and at 1100° C. for 1 hour. (By comparison, the tensile strength of a standard glass fiber HEPA media is 170 g.) Both hand sheets made in a mold and a continuous sheet are tested. The hard sheets were made with media densities of 215 g/m$^2$ and 430 g/m$^2$ to determine the effect of media density. Table 11 shows that the tensile strength of the media sintered at 1100° C. for 3 hours is proportional to the media density. The relationship under milder sintering conditions is less clear. The continuous sheet had a media density of 310 g/m$^2$ because of limitations in the 10 inch wide Fourdrinier machine.

Tensile strength increases with increasing sintering temperature and sintering time. Tensile strength also increases by increasing the density of the fiber mats from 215 to 430 g/m$^2$. The tensile strength of media with 6 mm steel fibers is greater than media made from 1 mm steel fibers, although depending on the sintering temperature and time, only slightly greater. The addition of a latex in order to improve the wet strength of the fiber mats, e.g., 10 wt%, B. F. Goodrich Geon-1562x103 acryonitrile latex, increased the tensile strength when sintered for 3 hours at 900° C. and 1000° C., and for 1 hour at 1100° C.; but lowered the tensile strength when sintered for 3 hours at 1100° C., probably because of carbonization of the latex at the higher sintering temperature and longer sintering time.

TABLE II

| Tensile Strength (g) of Sintered Fiber Mat | | | | |
|---|---|---|---|---|
| | H$_2$ Sintering Conditions | | | |
| | 900° C. | 1000° C. | 1100° C. | |
| Sample | 3 hrs | 3 hrs | 1 hr | 3 hrs |
| (1) Hand sheet 1 mm steel fibers 430 g/m$^2$ | 244 | 500 | 465 | 1552 |
| (2) Hand sheet 1 mm steel fibers 215 g/m$^2$ | 209 | 374 | 484 | 753 |
| (3) Hand sheet 6 mm steel fibers 430 g/m$^2$ | 294 | 759 | 1385 | 1753 |
| (4) Hand sheet 1 mm steel fiber 430 g/m$^2$ wet strength latex | 514 | 650 | 899 | 819 |
| (5) Hand sheet 1 mm steel fiber 215 g/m$^2$ wet strength latex | 278 | 281 | 750 | 458 |
| (6) Continuous sheet 1 mm steel fiber 310 g/m$^2$ | — | — | — | 940 |

Thus, great increases in filter strength can be obtained depending on the percent quartz and sintering conditions. Improvements in the fabrication and sintering process can lead to even better results. During the sintering process, the metal fibers are bonded together at points of contact. With uncompressed filter media, there are relatively fewer bonds between the metal fibers. By compressing the filter media prior to sintering, all metal fibers will be in contact and bond together during sintering, thus producing a higher strength media.

Figure 5A:
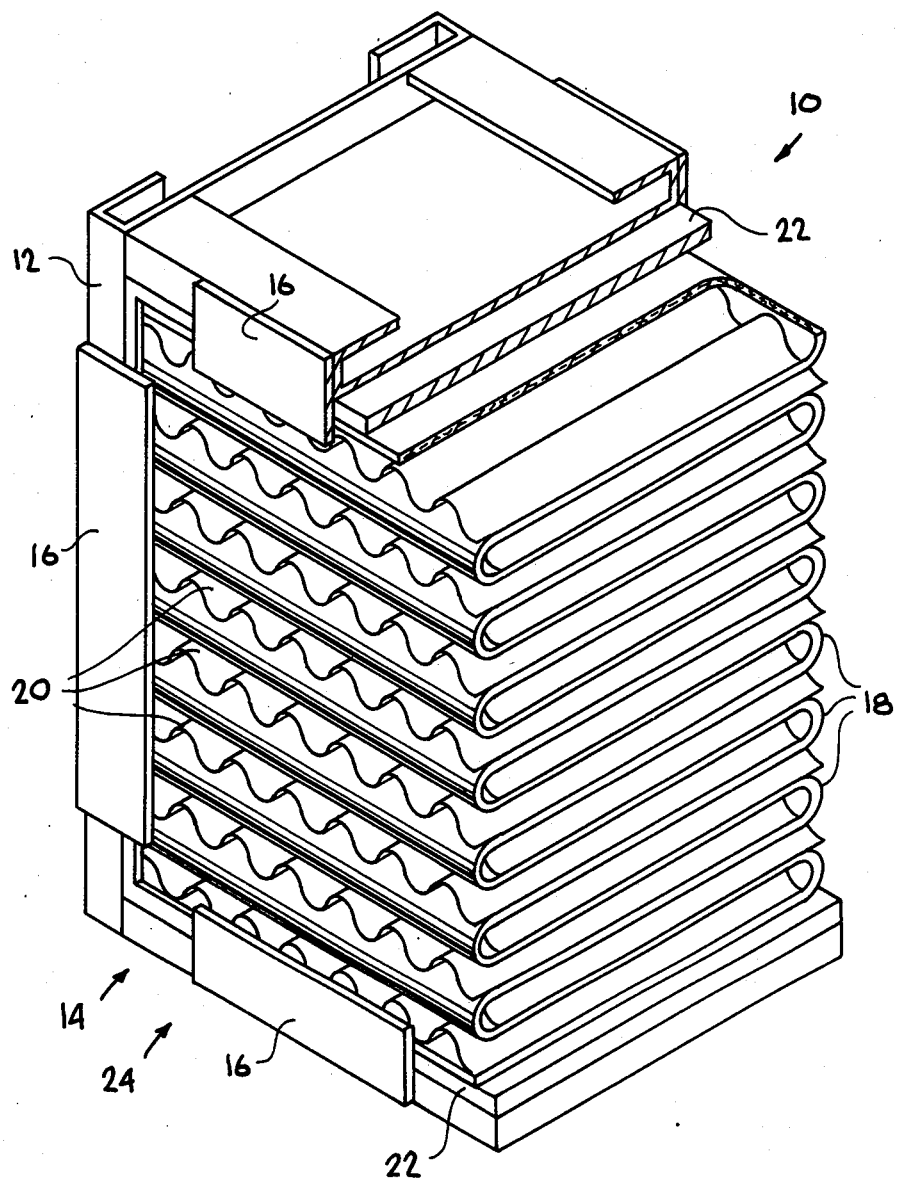
FIGS. 5A, B, C, D and E are perspective and sectional views of embodiments of a metallic HEPA filter utilizing the composite quartz stainless steel fiber media.

A metallic HEPA filter 10, using the composite sintered stainless steel quartz fiber media, is shown in FIG. 5A. The filter 10 comprises a housing 12 having an inlet or outlet port 24 and a similar port 25 on the opposite side to provide a flow path through the filter 10. A filter pack 14 is mounted in the housing 12 held by retainers 16. The filter pack 14 comprises a plurality of pleated layers 18 of the sintered composite quartz stainless steel fiber media mounted in housing 12 to provide large surface area in a small volume. A plurality of corrugated separators 20 mounted in housing 12 are placed between the layers 18 of filter media. A continuous strip of the filter media is pleated back and forth to form the layers 18 with separators 20. As shown, the media is folded at port 24 and then at the opposite port 25. A sealing means 22 is placed between filter pack 14 and housing 12 to seal the edges of the pleated layers 18. In assembling the filter, a continuous strip of filter media is utilized. Since the fiber media shrinks during the sintering operation, it may be desirable to sinter the media before assembly of the filter. However, once the filter media is sintered, it cannot be bent without cracking. Therefore it is preferred to pleat the filter media while it is wet and perform the sintering step after the filter pack is assembled. Although refractory separators could be used during the sintering operation and later replaced with corrugated steel separators, it is preferred to utilize the corrugated steel separators during the sintering operation, thereby fusing the separators and the media together, eliminating an extra step in the assembly process and producing a stronger filter pack. The corrugated separators are preferably 0.002" thick 304 stainless steel sheets. In assembling the filter pack, as the filter media is pleated back and forth, stainless steel separators are alternately added beneath a pleat and on top of a pleat. In producing the filter pack, shrinkage that occurs during sintering must be considered; for example, a filter pack with an initial height of 8.3" will shrink to about 6.5" after sintering. After the filter pack is assembled, water is removed by heating for about 6 hours at 200° C. The dry filter pack is then sintered in a hydrogen furnace for 3 hours at 1100° C.

The final step in fabricating the metallic HEPA filter is installing the filter pack inside a stainless steel housing and forming a leak-tight seal between the filter pack and the filter housing. The selection of an appropriate seal is critical to a successful high temperature HEPA filter. Since the filter pack has a low coefficient of thermal expansion and the steel filter housing has a high coefficient of expansion, a gap will form as the temperature increases; thus a suitable sealing material must expand with increasing temperature. A high temperature felt, called INTERAM, produced by 3-M Company is a preferred material for the sealing means. A layer of INTERAM felt is wrapped around the filter pack and the filter pack is then placed inside the steel housing.

Figure 5B:
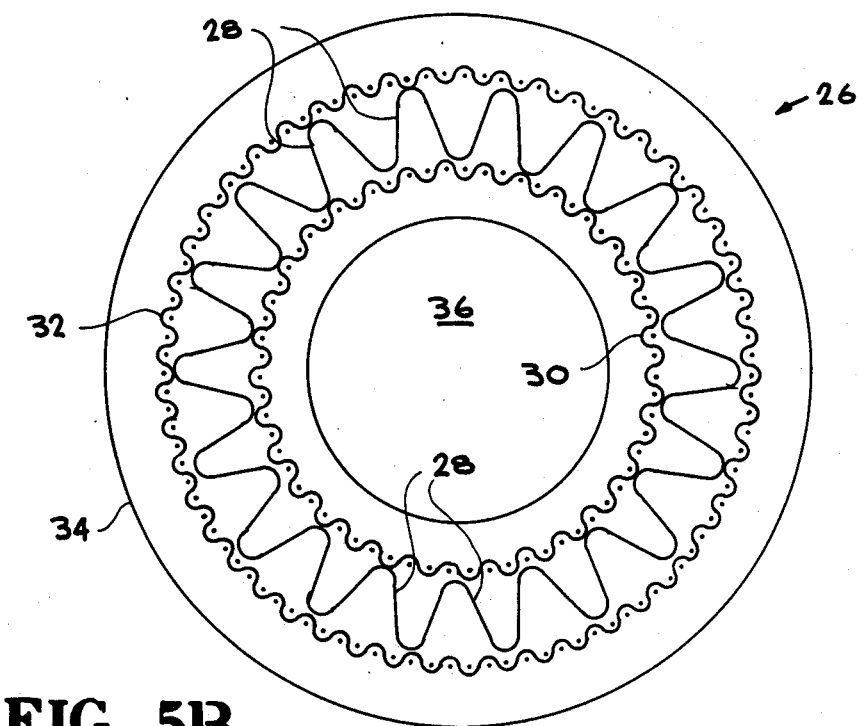
Figure 5C:
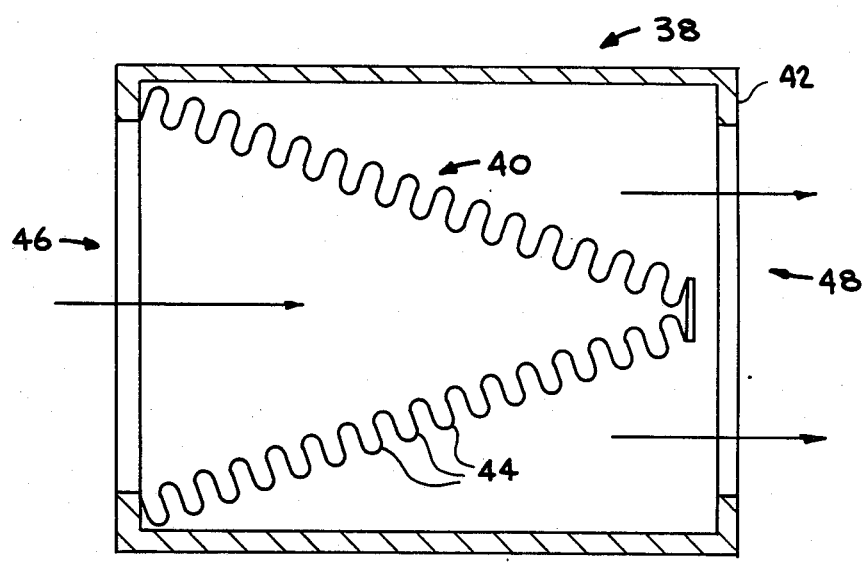

Although the rectangular structure of FIG. 5A is a preferred embodiment of a HEPA filter utilizing the composite media, the composite media can also be used in alternate embodiments. A radially pleated filter media could be disposed in a pleated cylindrical filter 26, as shown in FIG. 5B. A continuous strip of the composite filter media is formed with a plurality of radial pleats 28 extending radially in a hollow cylindrical structure. The pleated media may be contained between a porous inner wall 30 and porous outer wall 32 which are mounted on a base 34 which has an inlet/outlet port 36 therein. A flow path is provided radially through the pleats 28 between the interior and the exterior of the filter 26. In a mini-pleat filter 38, shown in FIG. 5C, a plurality of flat, pleated boards or panels 40 can be stacked in a zigzag configuration in a housing 42, thereby forming a primary pleat. Each panel 40 is made up of a plurality of pleated layers 44 of the composite filter media, forming a secondary pleat. Inlet port 46 and outlet port 48 provide a flow path through the pleated panels 40.

Figure 5E:
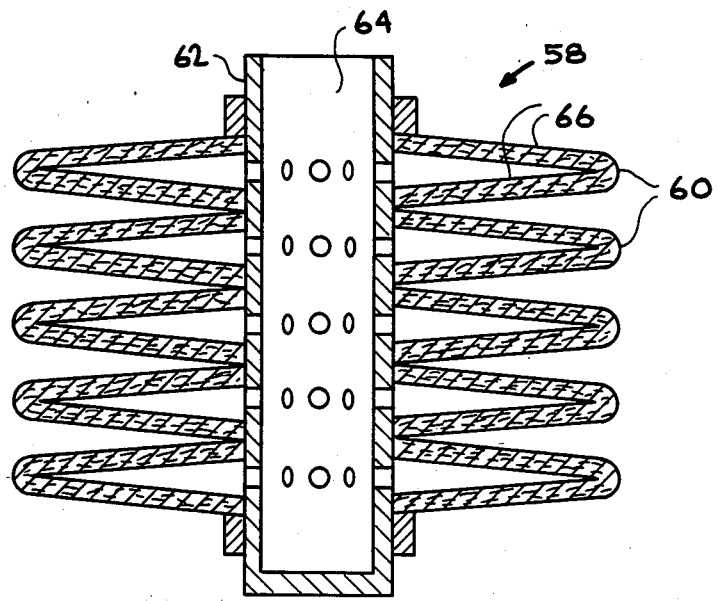
Figure 5D:
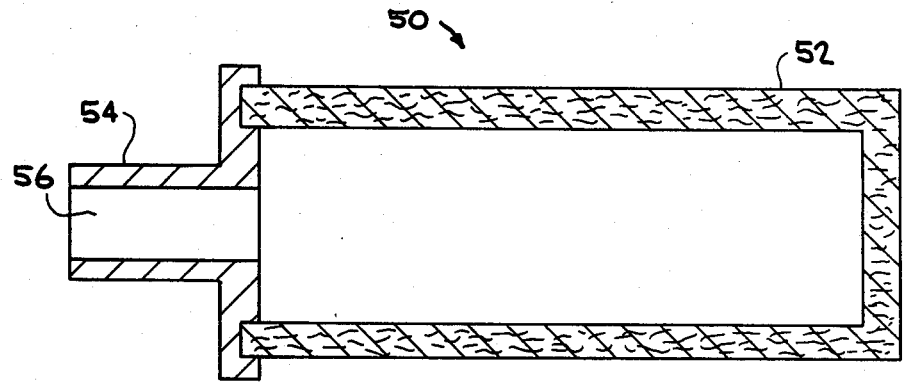

Another embodiment, shown in FIG. 5D is a cylindrical filter 50 which has a cylindrical layer 52 of sintered composite media around a hollow porous cylindrical housing 54 which has an inlet/outlet port 56. A flow path is defined between the interior and exterior of filter 50 through layer 52. The major difference between this design and the filter of FIG. 5B is that the layer 52 is not pleated so there is less surface area. An additional embodiment, shown in FIG. 5E is the stacked disk filter 58 which has a plurality of hollow porous disks 60 connected to and communicating with a hollow cylindrical housing 62 which has an inlet/outlet port 64. Each surface of the disks 60 are covered with a layer 66 of the sintered composite media. A flowpath is defined between the interior and exterior of filter 58 through the layers 66 of the filter media.

Changes and modifications in the specifically described embodiments can be carried out without departing from the scope of the invention, which is intended to be limited only by the scope of the appended claims.

I claim:

1. A filter media comprising a sintered composite of quartz fibers and stainless steel fibers having a filter efficiency of at least about 99.99% for 0.3 micron diameter particles, an operative temperature up to about 550° C., and flow resistance comparable to and tensile strength at least four times that of a standard high efficiency particulate air filter media.

2. The filter media of claim 1, wherein the stainless steel fibers are fused together to form a random three-dimensional cage structure, and the quartz fibers are mechanically held in a random orientation within the cage structure.

3. The filter media of claim 1, wherein the quartz and stainless steel fibers have been sintered at a temperature of about 1100° C.

4. The filter media of claim 1, wherein the quartz fibers have a diameter of about 0.5 microns and the stainless steel fibers have a diameter of about 2 microns.

5. The filter media of claim 1, wherein the media comprises about 40 vol.% quartz fibers and about 60 vol.% stainless steel fibers.

6. The filter media of claim 3, wherein the fibers have been sintered for about 2 hours.

7. The filter media of claim 1, comprising about 40 vol.% quartz fibers of about 0.5 micron diameter and about 60 vol.% stainless steel fibers of about 2 micron diameter.

8. The filter media of claim 7, wherein the stainless steel fibers are about 1 mm in length.

9. A high temperature high efficiency particulate filter, for gas or liquid filtration, operating at temperatures up to about 550° C., and having a filter efficiency of at least about 99.99% for 0.3 micron diameter particles, comprising:
- a filter housing having inlet and outlet ports;
- a filter pack mounted in the housing, comprising:
  - a plurality of pleated layers of a filter media of a sintered composite of quartz fibers and stainless steel fibers, mounted in the pack;
  - a plurality of corrugated separators between individual pleats and mounted in the pack; and
- sealing means between the pack and housing to seal the edges of the pleated layers.

10. A high temperature high efficiency particulate filter, for gas or liquid filtration, operating at temperatures up to about 550° C., and having a filter efficency of at least about 99.99% for 0.3 micron diameter particles, comprising:
- a cylindrical filter housing having inlet and outlet ports;
- a filter pack mounted in the housing, comprising a continuous strip of a filter media of a sintered composite of quartz fibers and stainless steel fibers, formed in a cylindrical configuration having a plurality of radial pleats, 11. A high temperature high efficiency particulate filter, for gas or liquid filtration, operating at temperatures up to about 550° C., and having a filter efficiency of at least about 99.99% for 0.3 micron diameter particles, comprising:
- a filter housing having inlet and outlet ports;
- a filter pack mounted in the housing, comprising:
  - a plurality of flat filter panels arranged in a zigzag configuration to form a primary pleat;
  - each panel comprising a continuous strip of a filter media of a sintered composite of quartz fibers and stainless steel fibers, folded in a plurality of pleated layers along the panel to form a secondary pleat.

12. A high temperature high efficiency particulate filter, for gas or liquid filtration, operating at temperatures up to about 550° C. and having a filter efficiency of at least about 99.99% for 0.3 micron diameter particles, comprising:
- a cylindrical filter housing having inlet and outlet ports;
- a layer of filter media of a sintered composite of quartz fibers and stainless steel fibers formed in a cylindrical configuration and mounted to the cylindrical housing.

13. A high temperature high efficiency particulate filter, for gas or liquid filtration, operating at temperatures up to about 550° C., and having a filter efficiency of at least about 99.99% for 0.3 micron diameter particles, comprising:
- a hollow porous cylindrical member having inlet and outlet ports;
- a plurality of hollow porous disks mounted in a stacked arrangement to and communicating with the cylindrical member to define a flow path therethrough;
- a layer of a filter media of a sintered composite of quartz fibers and stainless steel fibers mounted to each surface of the disks.

* * * * *